US009870099B2

(12) United States Patent
Barel (10) Patent No.: US 9,870,099 B2
(45) Date of Patent: Jan. 16, 2018

(54) PRESSURE SENSING DISPLAY (71) Applicant: Microsoft Technology Licensing, LLC, Redmond, WA (US)

(72) Inventor: Eliyahu Barel, Beit-Aryeh (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 15/083,397

(22) Filed: Mar. 29, 2016

(65) Prior Publication Data
US 2017/0285790 A1 Oct. 5, 2017

(51) Int. Cl.
*G06F 3/041* (2006.01)
*G06F 3/042* (2006.01)

(52) U.S. Cl.
CPC ............ *G06F 3/042* (2013.01); *G06F 3/0412* (2013.01); *G06F 3/0414* (2013.01); *G06F 2203/04107* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,570,468 B2 * | 8/2009 | Bernard | ................. | H02H 9/046 361/56 |
| 8,861,158 B2 * | 10/2014 | Zupcau | ............... | H01L 27/0285 361/56 |
| 9,086,770 B2 * | 7/2015 | Yilmaz | ................... | G06F 3/044 |
| 9,665,200 B2 * | 5/2017 | Filiz | .......................... | G01L 1/18 |
| 2009/0052100 A1 * | 2/2009 | Robb | ....................... | H02H 9/04 361/56 |
| 2010/0271742 A1 * | 10/2010 | Shannon | .............. | G01R 31/002 361/56 |
| 2012/0139864 A1 | 6/2012 | Sleeman et al. | | |
| 2014/0071092 A1 * | 3/2014 | Shih | ........................ | G06F 3/044 345/175 |
| 2014/0111465 A1 | 4/2014 | Shih et al. | | |

OTHER PUBLICATIONS

International Search Report and the Written Opinion dated Jun. 28, 2017 From the International Searching Authority Re. Application No. PCT/US2017/023933. (14 Pages).

* cited by examiner

*Primary Examiner* — Van Chow (57) ABSTRACT

A device includes an electronic display supported in a display chassis, a digitizer sensor overlaid on the electronic display, a circuit configured to detected touch interaction with the digitizer sensor based on output sampled and a display controller configured to control output on the electronic display. The electronic display includes an electrostatic discharge (ESD) shield layer. The ESD shield layer is electrically connected to device ground and the impedance to the device ground of the ESD shield layer is configured to be sensitive to pressure applied on the digitizer sensor during user interaction. The digitizer sensor output is sensitive to the change in the impedance of ESD shield layer to the device ground.

19 Claims, 11 Drawing Sheets

PRESSURE SENSING DISPLAY

BACKGROUND

Digitizer systems that include capacitive based sensors are used as input devices for a variety of Human Interface Devices (HIDs) and for a variety of different applications. A touch-screen is a digitizer system that is integrated with a Flat Panel Display (FPD). Touch-screens are used for operating portable devices, such as laptop computers, tablet computers, MP3 players, smart phones and other devices. Some digitizer systems track free style input provided with a finger and/or stylus. Capacitive based sensors are typically sensitive to touch and hover of finger or conductive object but may not be sensitive touch of a non-conductive object and may not provide information related the amount of pressured applied during touch.

SUMMARY

According to an aspect of some embodiments of the present disclosure there is provided an electronic display with integrated pressure sensing capabilities to track pressure applied on a touch-screen. According to an aspect of some embodiments of the present disclosure, one or more photodiodes are positioned around an optical stackup of a back light unit (BLU) of an electronic display to detect changes in intensity of light transmitted through the BLU due to user pressing on the touch-screen. According to an aspect of some embodiments, the intensity detected is related to pressure applied on the touch-screen. In some exemplary embodiments, location of touch is detected based on a detected pattern of intensities across the BLU.

According to an aspect of some other embodiments of the present disclosure, bending of the stackup due to a user pressing on the touch-screen is detected with one or more acoustic or ultrasound transducers, receivers or transducers/receivers.

According to an aspect of some other embodiments of the present disclosure, conductive elements of the electronic display are configured to alter their resistive properties or other electrical properties when pressed and the configured change in resistance alters the digitizer sensor's impedance to ground. According to some exemplary embodiments, other changes in impedance are detected from the digitizer sensor.

Unless otherwise defined, all technical and/or scientific terms used herein have the same meaning as commonly understood by one of ordinary skill in the art. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

A FPD such as a liquid crystal display (LCD) typically includes a display optical stackup, a thin-film transistor (TFT) module and backlight unit (BLU). The BLU may include a stackup of optical layers such as a reflector, a light guide, diffuser, prism, and protective film through which a light source, e.g. a cold cathode fluorescent tube (CCFT) lamp or LED strip illuminates. The BLU is typically positioned under a TFT module and light from the BLU is selectively transmitted through the display optical stackup.

According to some exemplary embodiments, one or more optical sensors, e.g. light receivers or photodiodes are positioned along edges of the BLU. In some exemplary embodiments, an array of photodiodes is configured to detect light transmitted through the optical stackup of the BLU. The light may be from a light source of the BLU or from dedicated LEDs that are arranged around the BLU. In some exemplary embodiments, dedicated LEDs are configured to emit light in the IR range and the photodiodes are configured to receiving light in the IR range. External force due to a user touching the touch-screen bends the optical stackup of the BLU and leads to local shuttering of the light from the light source of the BLU. The shuttering may be detected by the array of photodiodes.

In other exemplary embodiments, an array of optical sensors, e.g. photodiodes positioned around edges of a BLU are adapted to detect light reflected and scattered through a particular transparent layer of the BLU optical stackup, e.g. the light guide layer or protective film layer. In some exemplary embodiments, the light is emitted by a dedicated LED, e.g. an array of LEDs positioned around edges of BLU and typically across the optical sensors. External force due to a user touching the touch-screen bends the optical stackup of the BLU, creates physical contact between the layers and scatters the light transmitted through the transparent layer and alters the reflection pattern. These changes typically lead to reduce intensity of light detected by optical sensors near the location of touch.

Optionally, intensity of light detected by the photodiodes at a location of touch is inversely related to pressure applied on the touch-screen. Optionally, spread of an area affected by the pressure applied is identified based on outputs from an array of photodiodes and the spread identified is related to a level of pressure applied on the touch screen. One or more look-up tables or a defined function relating intensity or spread to applied pressure is stored. Output, e.g. intensity from the photodiodes may be applied to detect both a level of pressure and may also be applied to detect a location of touch. Location of touch may be a location at which a peak in the intensity is detected, e.g. a negative peak. Optionally, touch of a finger, stylus or non-conductive object may be detected with the methods described herein.

In some exemplary embodiments, acoustic transducers and receivers are used instead of the optical sensors to detect bending of the stackup layers due to physical contact and pressure applied on the touch-screen. In some exemplary embodiments, an acoustic transducer and receiver is positioned under the display chassis and movement or physical contact of the display chassis with respect to the chassis of the computing device is detected.

A touch-screen may typically include a digitizer sensor overlaid on an electrostatic discharge (ESD) shield layer (or electromagnetic interference (EMI) shield layer) of the electronic display. A cover glass typically, protects the upper digitizer sensor layer and provides an upper cover for the electronic display. The ESD shield layer is typically connected to system ground. According to some exemplary embodiments, pressure sensitive or strain sensitive conductive material is used to connect the ESD shield layer to the system ground. The pressure sensitive (or strain sensitive) conductive material may be configured to alter is resistive or conductive properties in response to the pressure. Changes in resistance may lead to changes in grounding state of the ESD shield. According to some exemplary embodiments, a digitizer sensor is sensitive to changes in the grounding state of the ESD shield. The change in grounding state of the ESD shield may be detected based on output from the digitizer sensor. Typically, the baseline output detected is a function of change in the grounding state.

Figure 1:
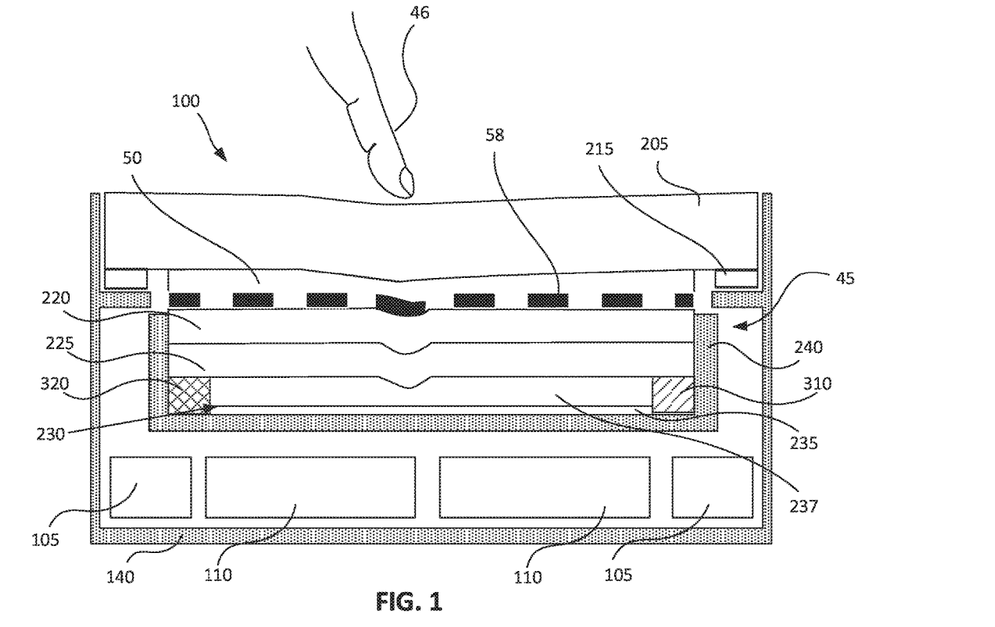
FIG. 1 is a simplified schematic cross-sectional view of an exemplary computing device including optical components for detecting pressure applied on a touch-screen of the device in accordance with some exemplary embodiments of the present disclosure.

Reference is now made to FIG. 1 showing a simplified cross-sectional view of an exemplary computing device including a touch-screen in accordance with some exemplary embodiments of the present disclosure. A touch sensitive device 100 typically includes a cover glass 205 over which a user interacts with a fingertip 46 or a stylus. Cover glass 205 provides a protective cover for a display 45 and a digitizer sensor 50 overlaid on display 45. Digitizer sensor 50 may include one or more layers with sensing electrodes 58 adapted for capacitive based sensing. Display 45 typically includes a stackup that is housed or supported in display chassis 240. Display chassis 240 is typically formed from rigid material and is typically metallic. Typically, display chassis 240 is electrically connected to system ground. One or more batteries 110 and circuit boards 105 including circuitry for operating and controlling operation of device 100 may be positioned below or around display 45. A device chassis 140 houses and supports the elements of device 100. Typically, cover glass 205 is fixedly attached to device chassis 140 with tape or glue 215.

Display 45 may be FPD (such as an LCD) formed with a stackup of layers including for example a color filter glass 220, a TFT layer 225 and a BLU layer 230. BLU layer 230 may include an optical stackup 237 and one or more light sources 235. Light source 235 may be an array of LEDs positioned along two adjacent edges of BLU 230 or may be a pair of cold cathode fluorescent (CCFL) lamps. Optical stackup 237 typically functions to diffuse and reflect light from light source 235.

Typically, cover glass 205, digitizer sensor 50 and each of the film layers in the stackup of display 45 is thin and therefore bendable in response to touch of fingertip 46 and a stylus. The glass layers may have in some examples a thickness between 200-500 µm and the film layers may have in some examples a thickness of between 50-100 µm.

According to some exemplary embodiments, one or more photodiodes 310 and typically an array of photodiodes 310 are positioned along edges of optical stackup 237 and are directed to receive light transmitted by LEDs 320. The light detected is transmitted across stackup 237 in a direction parallel to the layers of the stackup. In some exemplary embodiments, photo-diodes 310 are mounted on a bottom face of TFT layer 225 facing BLU layer 230, e.g. under TFT layer 225. Alternatively, photodiodes 310 may be mounted or supported on a surface of display chassis 240, on a bottom surface of optical stackup 237 along edges of the stackup, or on a plastic peripheral frame surrounding optical stackup 237.

LEDs 320 may be the LEDs used to illuminate display 45 or may be added to the BLU and dedicated for pressure sensing. Optionally, LEDs dedicated for pressure sensing are selected to be in an IR range or other range that is not visible to a user and does not interfere with illumination of display 45. Optionally, the photodiodes 310 are adapted to detect light in the IR range emitted by the LEDs. LEDs 320 may be mounted around optical stackup 237 in a same manner that photodiodes 310 are mounted. In some exemplary embodiments, each photodiodes 310 is positioned to face one LED 310.

Stackup 237 may include a reflector, a light guide, and a protective film layer. Bending due to interaction over cover glass 205 may compress the layers and optionally cause contact between layers in optical stackup 237 and obstruct transmission of light from light source 235 through optical stackup 237 at the location of bending due to pressure applied by a user when touching cover glass 205. The obstruction or light shuttering may cause changes in an intensity of light detected by the photodiodes 310 at the location of touch. Optionally, output from photodiodes 310 is sampled by circuitry associated with digitizer sensor 50 and detected intensity is related to a level of pressure applied on cover glass 205. Optionally, LEDs 320 may also be controlled by circuitry associated with digitizer sensor 50. Typically, intensity of light detected is inversely proportional to pressure applied on cover glass 205 at the location of touch. Optionally, a touch location 350 is detected based on output from an array of photodiodes 310 and a spread of touch location 350, e.g. area over which touch location is spread, is related to a level of pressure applied on cover glass 205. Typically, intensity below a defined threshold indicates that pressure is being applied at a location coinciding with position of a photodiode from which the intensity was detected.

Figure 2A:
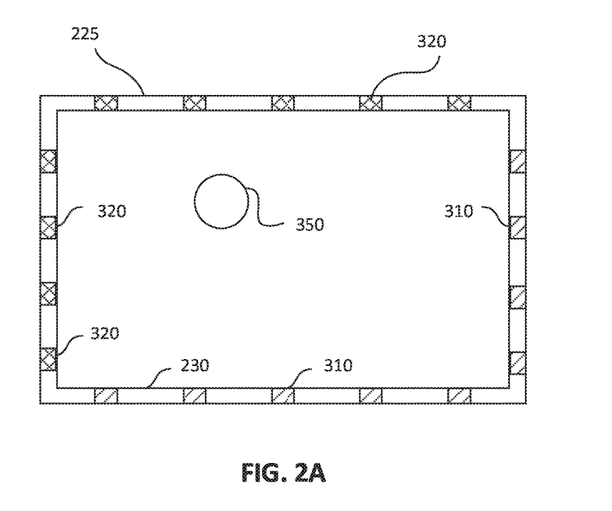
FIGS. 2A, 2B and 2C are simplified schematic drawings showing three exemplary arrangements for positioning photodiodes and LEDs along edges of a BLU in accordance with some exemplary embodiments of the present disclosure.
Figure 2B:
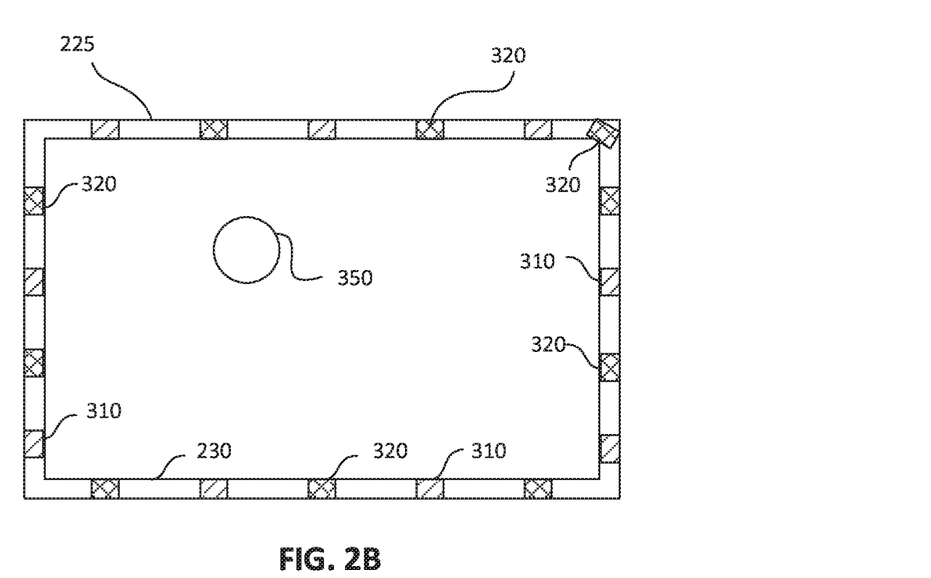
Figure 2C:
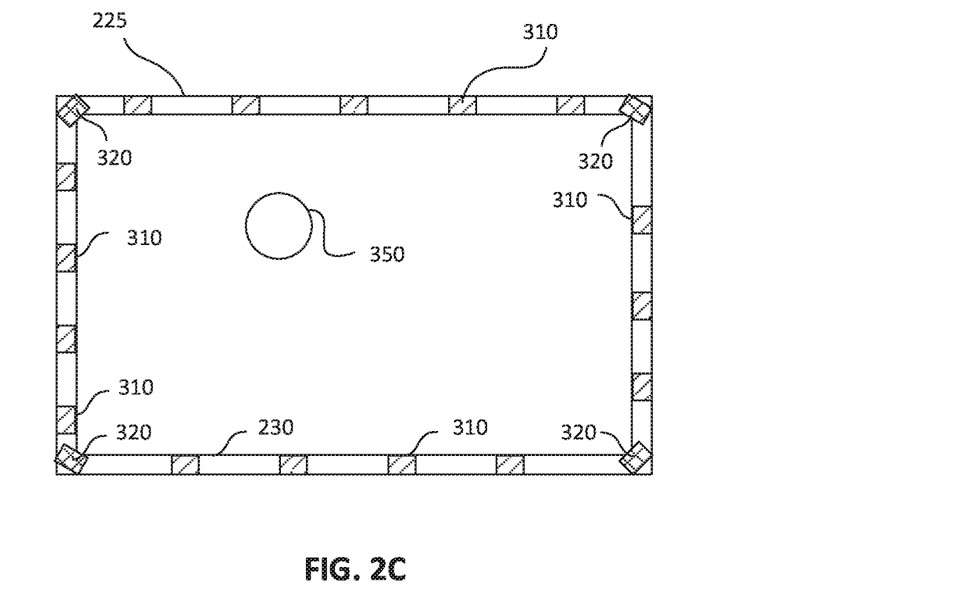

Reference is now made to FIGS. 2A, 2B and 2C showing simplified schematic drawings of three exemplary arrangements for positioning photodiodes and LEDs along edges of a BLU in accordance with some exemplary embodiments of the present disclosure. In some exemplary embodiments, an array of photodiodes 310 is positioned beneath a TFT layer 225 and along edges of an optical stackup 237 of BLU 230. In some exemplary embodiments, photodiodes 310 are positioned along at least two edges of optical stackup 237 facing LEDs 320 positioned along opposite facing edges of optical stackup 237 as shown in FIG. 2A. In other embodiments, both photodiodes 310 and LEDs 320 are spread along all four edges of optical stackup 237 each photodiode 310 is positioned to face an LED 320 (FIG. 2B). Alternatively, LEDs 320 may be positioned on corners of stackup 237 directed toward center of the stackup and photodiodes 310 may be spread around edges of stackup 237 (FIG. 2C). Photodiodes 310 may be spread along at least two adjacent edges so that a location of applied pressure may be determined in two dimensions.

Figure 3:
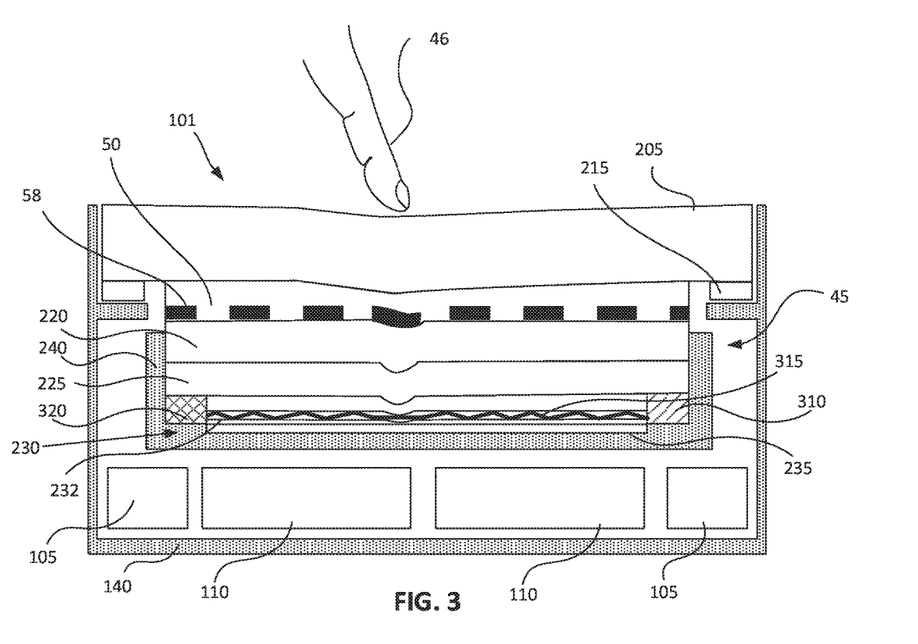
FIG. 3 is a simplified schematic cross-sectional view of another exemplary computing device including optical components for detecting pressure applied on a touch-screen of the device in accordance with some exemplary embodiments of the present disclosure.

Reference is now made to FIG. 3 showing a simplified schematic cross-sectional view of another exemplary computing device including a touch-screen in accordance with some exemplary embodiments of the present disclosure. A touch sensitive device 101 may be similar to device 100 described herein above and may include many of the same elements. According to some exemplary embodiments, LEDs 320 are adapted to illuminate through a transparent layer 232 in stackup 237 and photodiodes 310 are adapted to detect output from transparent layer 232. Transparent layer 232 may operate as a light guide, e.g. may be used as a sensor light guide. Light emitted from LEDs 320 may be trapped in layer 232 and reflect off surfaces of layer 232. Bending and physical contact of layer 232 with other layers due to pressure applied on cover glass 205 may alter the reflection pattern and cause scattering of light 315 at a location of touch. These changes may reduce intensity of light detected at one or more photodiodes 310. A location of applied pressure and a degree of pressure applied may be related to intensity of light detected at photodiodes 310. Optionally, a spread of an area affected by touch is detected, and dimensions of the spread may be related to a degree of pressure applied. According to some exemplary embodiments, a relationship between intensity of light, spread of an area affected by touch and pressure is stored in circuitry in device 100. The defined relationship may be used to detect a location at which the pressure is applied as well as to detect a level of pressure applied.

Photodiodes 310 and LEDs 320 may be arranged along edges of BLU as described in reference to FIGS. 2A, 2B and 2C. Photodiodes 310 and LEDs 320 may be mounted on TFT layer, e.g. on the underside of TFT layer, on display chassis 240 or on edges of stackup 237, e.g. on edges of layer 232.

Figure 4A:
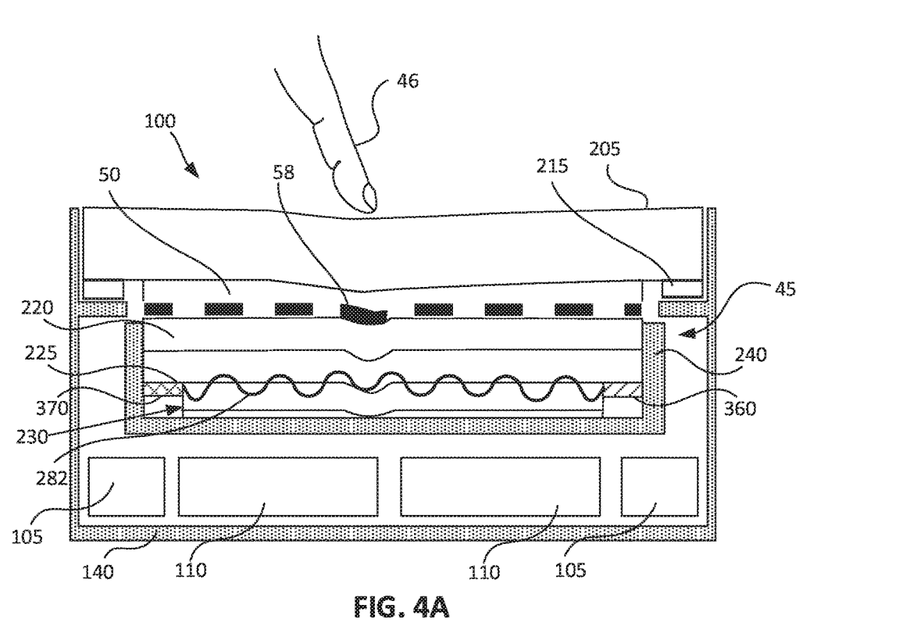
FIGS. 4A, 4B and 4C are simplified schematic cross-sectional views of exemplary computing devices including acoustic components for detecting pressure applied on a touch-screen of the device in accordance with some exemplary embodiments of the present disclosure.
Figure 4B:
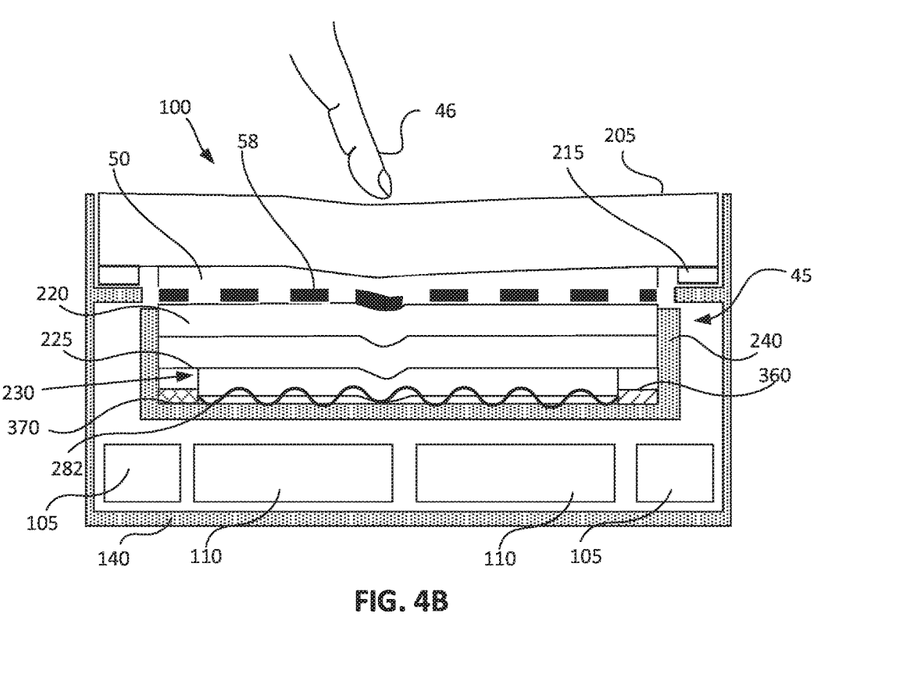
Figure 4C:
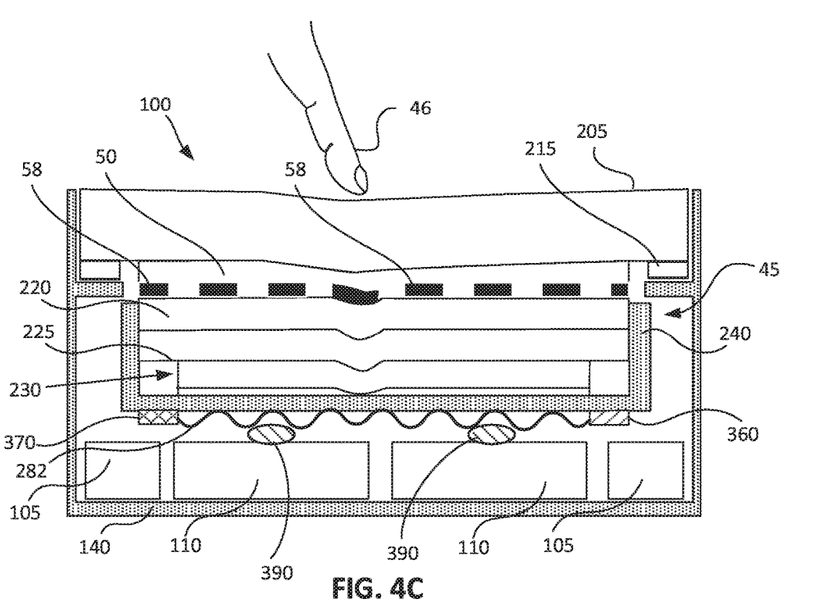

Reference is now made to FIGS. 4A, 4B and 4C showing simplified schematic cross-sectional views of exemplary computing devices including acoustic components for detecting pressure applied on a touch-screen of the device in accordance with some exemplary embodiments of the present disclosure. According to some exemplary embodiments, one or more ultrasound transducers 370 and ultrasound receivers 360 may be positioned around BLU and may detect bending of the optical stackup of the BLU. Triangulation may be used to detect location of applied pressure. Optionally, a single transducer/receiver element may be used to both transmit ultrasound waves and also to detect echoing of the waves. Ultrasound transducers 370 and ultrasound receivers 360 may be mounted on TFT 225 (FIG. 4A) or on display chassis 240 (FIG. 4B). A wave emitted 282 by transducer 270 may be obstructed by the bending of the stackup layers at the touch location. Changes in the output detected from the receivers may be related to a level of pressure based on a pre-defined relationship defined during a calibration procedure.

In some exemplary embodiments, one or more ultrasound transducers 370 and ultrasound receivers 360 may be positioned under display or around display chassis 240 between display 45 and device chassis 140 (FIG. 4C). Pressure applied on protective cover 205 compresses tape 215 and moves display chassis 240 with respect to device chassis 140. One or more spacers 390 may be positioned on elements secured on device chassis 140 to obstruct wave 282 by various degrees based on movement of display chassis 240 with respect to chassis 140. Alternatively, the ultrasound transducers 370 and ultrasound receivers 360 may be positioned on circuit boards 105 and the spacers 390 may be positioned on display chassis 240.

Amplitude of output from the receivers 360 may be related to a pressure applied on cover glass 205. A general location of touch may be detected when more than one receiver is positioned around display chassis 240.

Figure 5:
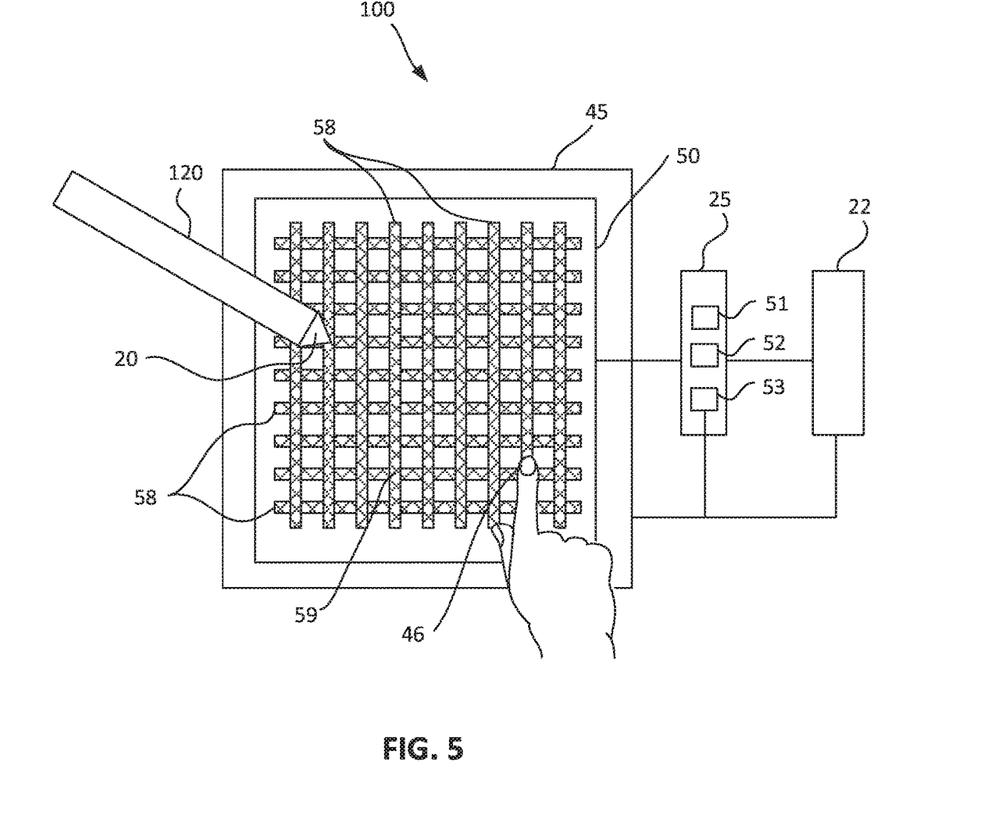
FIG. 5 is a simplified block diagram of an exemplary computing device with a touch-screen in accordance with some exemplary embodiments of the present disclosure.

Reference is now made to FIG. 5 showing a simplified block diagram of an exemplary computing device with a touch-screen in accordance with some exemplary embodiments of the present disclosure. According to some embodiments of the present disclosure, a computing device 100 (or device 101) includes a pressure sensitive display 45 that is integrated with digitizer sensor 50. According to some exemplary embodiments, pressure sensing elements are integrated into a stackup of display 45 and digitizer sensor 50 is overlaid on display 45. Display 45 may be for example a LCD or other FPD that is formed with a printed stackup. Optionally digitizer sensor 50 is also integrated into the stackup of display 45, e.g. on-cell or in-cell.

In some exemplary embodiments, digitizer sensor 50 is a grid based capacitive sensor formed with row and column conductive strips 58. Typically, conductive strips 58 are arranged to enhance capacitive coupling between row and column conductive lines, e.g. around junctions 59 formed between rows and columns in response to presence of a conductive object. Conductive strips 58 may be operated to detect input by touch of one or more fingertips 46, a stylus 120 or other conductive or dielectric objects. Stylus 120 may be a passive stylus including for example a writing tip 20 formed with conductive or dielectric material. Alternatively, stylus 120 may be an active stylus transmitting an electromagnetic signal.

In some exemplary embodiments, input provided by an active stylus is one or more signal bursts and/or pulses that are transmitted by the stylus at a defined repetition rate. Digitizer circuitry 25 may include dedicated stylus detection circuitry 51 for synchronizing with the active stylus, for processing input received by the stylus 120 and/or for tracking coordinates of the stylus.

Optionally, a circuit 25 applies a mutual capacitance detection method and/or a self-capacitance detection with sensor 50 for sensing interaction with fingertip 46 or a passive stylus. Typically, during mutual capacitance and self-capacitance detection, digitizer circuitry 25 sends a triggering pulse and/or interrogation signal to one or more conductive strips 58 of digitizer sensor 50 and samples output from other conductive strips 58 in response to the triggering and/or interrogation. Optionally, circuit 25 includes dedicated capacitive touch detection circuitry 52 adapted to track input from a fingertip 46 or a passive pen. According to some exemplary embodiments, circuit 25 may additionally include dedicated pressure sensing circuitry 53 for processing input received from pressure sensing elements, e.g. optical sensors and acoustic sensors integrated in display 45. Optionally, pressure sensing circuitry 53 is adapted to sample output from photodiodes or ultrasound receivers included in display 45. Alternatively, display 45 includes circuitry for sampling the output from the pressure sensing elements and the output is reported to sensing circuitry 53. Optionally, one or more lookup tables that define a relationship between detected output and applied pressure is stored in association with pressure sensing circuitry 53.

Typically, output from digitizer circuitry 25 is reported to host 22. Typically, the output provided by digitizer circuitry 25 may include coordinates of writing tip 20, any information transmitted by stylus 120 if stylus 120 is an active stylus, coordinates of one or more fingertips 46, pressure applied by stylus 120 with tip 20 or fingertip 46.

Optionally, some and/or all of the functionalities of digitizer circuitry 25, dedicated circuitry 51, 52 and 53 are integrated and/or included in host 22.

Figure 6:
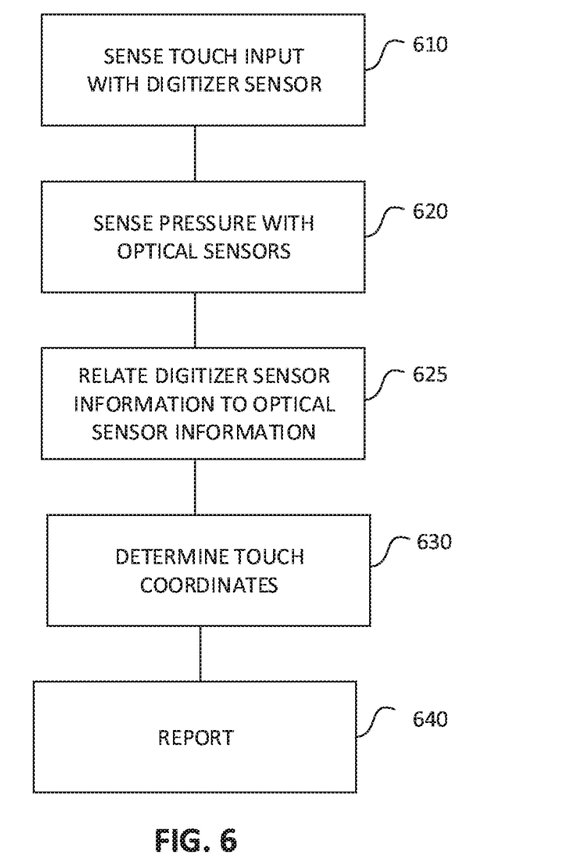
FIG. 6 is a simplified flow chart of an exemplary method for tracking touch input to a touch enabled computing device in accordance with some exemplary embodiments of the present disclosure.

Reference is now made to FIG. 6 showing a simplified flow chart of an exemplary method for tracking touch input to a touch enabled computing device in accordance with some exemplary embodiments of the present disclosure. A touch sensitive device periodically interrogates the digitizer sensor for touch input (block 610). Touch input may be input from a fingertip, hand, stylus, or other object and may include both input by contact with the touch sensitive display and input by hovering over the touch sensitive display. According to some exemplary embodiments, the device also periodically senses pressure with optical detectors that are integrated in the display (block 620). Information sensed with digitizer sensor may be related to pressure information sensed with the optical detectors (block 625). Spread of a touch area based on digitizer sensor output and based on output from the optical sensor is compared. Optionally, a pressure level is determined based on amplitudes of the outputs detected from the optical sensor, spread of an area effected by pressure and based on the comparison. Touch coordinates of a finger, stylus or hand may be determined based on information sensed the digitizer sensor, information sensed with optical sensors or with both (block 630). In some exemplary embodiments, coordinates of touch and pressure as sensed with optical detector and are reported to host (block 640). In some exemplary embodiments, only coordinates of touch may be reported to the host and the coordinates reported are determined based on both touch and pressure information.

According to some exemplary embodiments when acoustic transducers and receivers are used in place of optical emitters and detectors, the device periodically senses pressure with acoustic receivers and information sensed with digitizer sensor may be related to pressure information sensed. Touch coordinates of a finger, stylus or hand may be determined based on information sensed the digitizer sensor, information sensed with the acoustic receivers or both. In some exemplary embodiments, coordinates of touch and pressure are reported to host. In some exemplary embodiments, only coordinates of touch may be reported to the host and the coordinates reported are determined based on both touch and pressure information.

Figure 7:
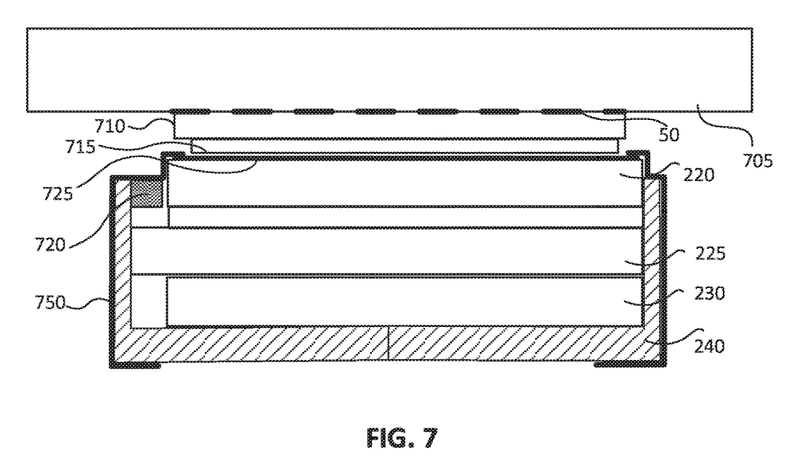
FIG. 7 is a simplified schematic cross-sectional view of an exemplary computing device including pressure sensitive rim tape for detecting pressure applied on a touch-screen of the device in accordance with some exemplary embodiments of the present disclosure.
Figure 8:
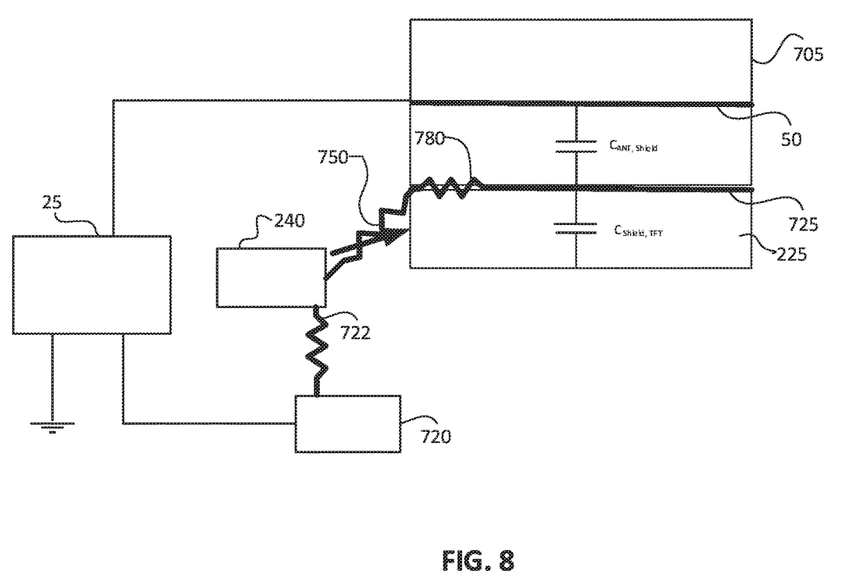
FIG. 8 is a simplified schematic circuit diagram showing an exemplary electrical connection between the pressure sensitive rim tape and elements of the display in accordance with some exemplary embodiments of the present disclosure.

Reference is now made to FIG. 7 showing a simplified schematic cross-sectional view of an exemplary computing device including pressure sensitive rim tape for detecting pressure applied on a touch-screen of the device and to FIG. 8 showing a simplified schematic circuit diagram of an exemplary electrical connection between the pressure sensitive rim tape and elements of the display both in accordance with some exemplary embodiments of the present disclosure. In some exemplary embodiments, a digitizer sensor 50 is integrated on a face of cover glass 705 and adhered to a display 45 with optically clear adhesive (OCA) 710. Alternatively, digitizer 50 may be formed from one or more separate layers. Typically, a polarizer film 715 is positioned between OCA 710 and CF glass 220 with an ESD shield, e.g. ITO shield 725 in between. Display chassis 240 houses components of display 45 including for example the CF glass 220, LCD controller 720, TFT glass 225 and BLU 230. In some exemplary embodiments, rim conductive tape 750 secures components of display 45 in chassis 240 and also provides an electrical connection to ground for LCD controller 720 and ITO shield 725 via display chassis 240 which is typically connected to system ground.

The bonding of digitizer sensor 50 to display 45 makes ITO shield 725 an active part of digitizer sensor 50. A change in a grounding state of ITO shield 725 effects output of digitizer sensor 50. A baseline output detected on digitizer sensor 50 may be sensitive to a change in the grounding state of ITO shield 725. When the impedance to ground increases, the baseline amplitude may typically increase. When the impedance to ground decreases, the baseline amplitude may typically decrease. The change in baseline amplitude may be detected.

The change may be local when rim conductive tape 750 is divided into separate isolated elements so that only tape 750 near a touch location is compressed. Alternatively, the change may be global or near global.

According to some exemplary embodiments, pressure sensitive material, strain sensitive material or pattern design or other concept that may create variance of connectivity, may be embedded or integrated in tape 750 and a change in resistance or in the connectivity alters the resistance to ground via rim conductive tape 750.

Figure 9:
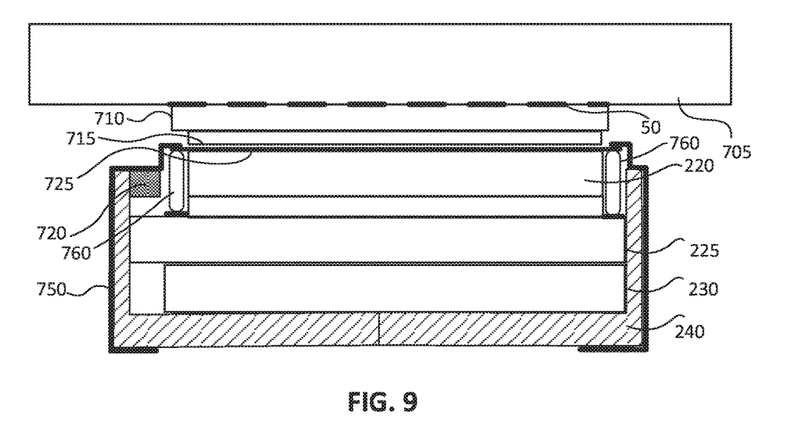
FIG. 9 is a simplified schematic cross-sectional view of an exemplary computing device including pressure sensitive conductive spacers for detecting pressure applied on a touch-screen of the device in accordance with some exemplary embodiments of the present disclosure.
Figure 10:
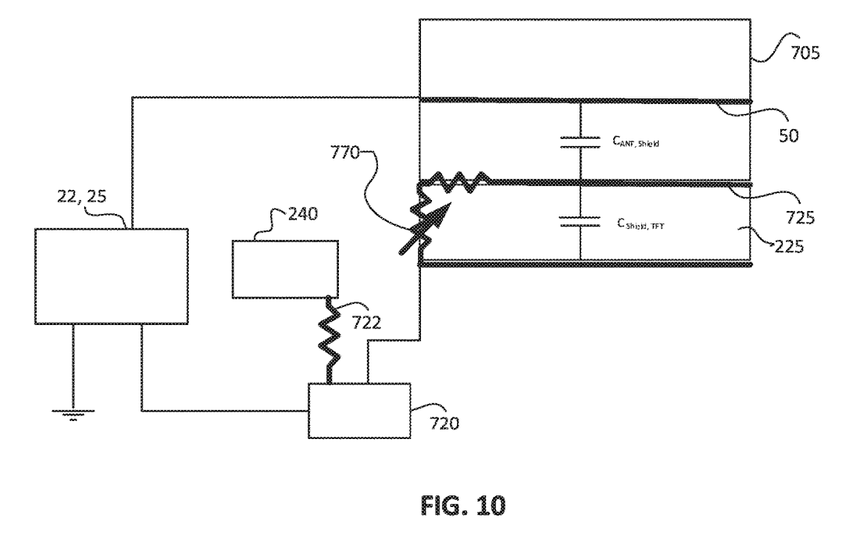
FIG. 10 is a simplified schematic circuit diagram showing an exemplary electrical connection between the pressure sensitive spacers and elements of the display in accordance with some exemplary embodiments of the present disclosure.

Reference is now made to FIG. 9 showing a simplified schematic cross-sectional view of an exemplary computing device including pressure sensitive (or strain sensitive) conductive spacers for detecting pressure applied on a touch-screen of the device and to FIG. 10 showing a simplified schematic circuit diagram of an exemplary electrical connection between the pressure sensitive spacers and elements of the display both in accordance with some exemplary embodiments of the present disclosure. FIGS. 9 and 10 are similar to FIGS. 8 and 9 respectively except that conductive spacers 760 provide the connection to ground by electrically connecting display controller 720 and ITO shield 725 to display chassis 240. In this exemplary embodiment, ITO shield 725 is connected to display controller 720 via resistance 770 of conductive spacer 760 and to chassis 240 via resistance 722 of conductive tape connecting display controller 720 to chassis 240. According to some exemplary embodiments, pressure sensitive material may be embedded in a conductive spacer 760 and a change in resistance of the pressure sensitive material alters the resistance via a conductive spacer 760.

Figure 11:
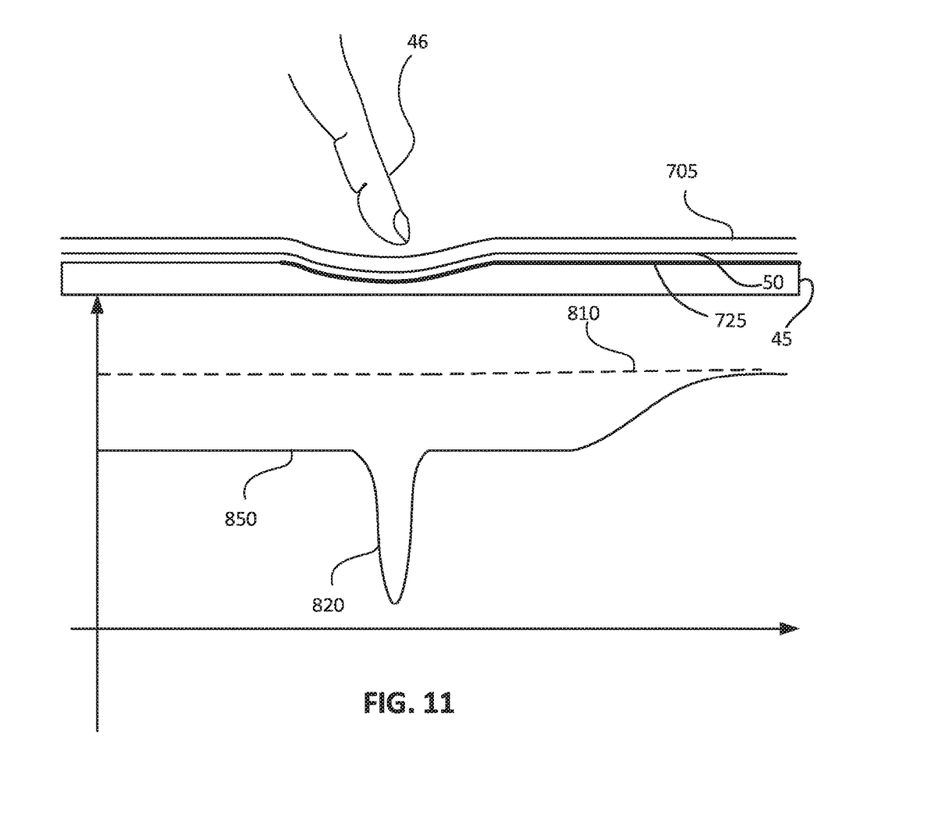
FIG. 11 is a simplified schematic graph of outputs detected from a digitizer sensor in accordance with some exemplary embodiments of the present disclosure.

Reference is now made to FIG. 11 a simplified schematic graph of outputs detected from a digitizer sensor in accordance with some exemplary embodiments of the present disclosure. Outputs along only one exemplary axis row of electrodes are shown for simplicity purposes. In some exemplary embodiments, baseline outputs 810 are typically detected when no pressure is applied on the cover glass 205 (covering the digitizer sensor). When a user touches cover glass 205 with a fingertip 46 a capacitive effect 820 is typically detected. According to some exemplary embodiments, touch of fingertip 46 bends cover glass 205 and applies pressure on conductive elements that are configured to electrically connect a shield 725 to display ground. The shield is positioned between digitizer sensor 50 and electronic display 45. Resistance of the conductive elements are configured to change based on pressure and this change changes the baseline output on digitizer sensor 50. When the resistance is configured to decrease as pressure is increased, the baseline output 850 decreases. Alternatively, if the resistance is configured to increase as pressure is increased, the baseline output 850 may increase as compared to baseline 810.

Figure 12:
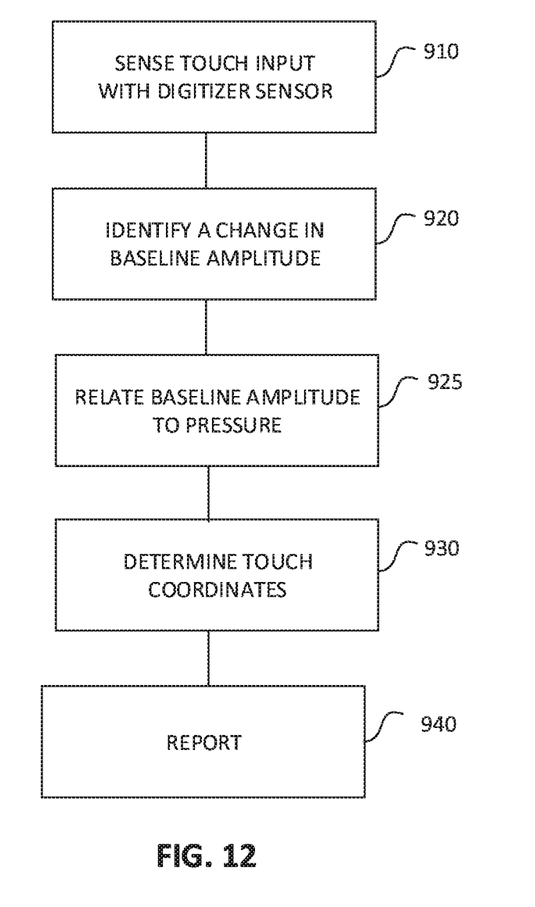
FIG. 12 showing a simplified flow chart of an exemplary method for tracking touch input to a touch enabled computing device in accordance with some exemplary embodiments of the present disclosure.

Reference is now made to FIG. 12 showing a simplified flow chart of an exemplary method for tracking touch input to a touch enabled computing device in accordance with some exemplary embodiments of the present disclosure. A touch sensitive device periodically interrogates the digitizer sensor for touch input (block 910). Touch input may be input from a fingertip, hand, stylus, or other object and may include both input by contact with the touch sensitive display and input by hovering over the touch sensitive display. According to some exemplary embodiments, a change in the baseline amplitude is detected (block 920). Pressure may also be detected based on baseline amplitude (block 925). Pressure detected may be used as an indication that a user is interacting with the touch-screen. This indication may be used to wake-up the digitizer system or the display. Optionally, a level of pressure is related to a change in baseline amplitude and the baseline amplitude is used to monitor pressure level applied during writing. Touch coordinates of a finger, stylus or hand may be determined based on information sensed by the digitizer sensor (block 930). Coordinates of touch and optionally pressure is reported to host (block 940).

According to an aspect of some exemplary embodiments there is provided a device comprising: an electronic display formed with a stackup of layers; an array of optical sensing elements embedded on at least one layer of the stackup or on a chassis of the electronic display; and a circuit connected to the optical sensing elements, wherein the circuit is configured to relate output from the optical sensing elements to pressure applied on the electronic display.

Optionally, the stackup includes a backlight unit (BLU) wherein the optical sensing elements are adapted to detect light along one or more edges of the BLU.

Optionally, the BLU includes a BLU optical stackup and wherein the optical sensing elements are configured to detect light shuttering through the BLU optical stackup in a direction parallel to surfaces of layers in the stackup, wherein the light shuttering is based on bending of the BLU optical stackup at a location of touch interaction with the electronic display.

Optionally, the BLU includes a BLU optical stackup and wherein the optical sensing elements are configured to detect light scattering and reflecting through a transparent layer of the BLU optical stackup in a direction parallel to the surface of transparent layers, wherein the light scattering is based on bending and physical contact of the BLU optical stackup at a location of touch interaction with the electronic display.

Optionally, the optical sensing elements include an array of optical sensing elements on each of at least two adjacent edges of the BLU and wherein location of a touch interaction is identified based on output from the array on each of the at least two adjacent edges.

Optionally, the stackup includes a thin-film-transistor (TFT) layer and wherein the optical sensing elements are positioned on the TFT layer.

Optionally, the optical sensing elements are positioned on backside of the TFT layer with respect to a front face of the electronic display or on a chassis of the display.

Optionally, the optical sensing elements are photodiodes.

Optionally, the photodiodes are configured to detect light in an infrared (IR) range.

Optionally, the device includes one or more light emitting diodes (LEDs) embedded on the at least one layer of the stackup, the one or more LEDs positioned to share a line of sight with at least one of the photodiodes.

Optionally, the optical sensing elements are configured to detect changes in light intensity based on bending and physical contact of the stackup, wherein the bending is based on pressure applied on the display during user touch interaction.

Optionally, the device includes a capacitive based digitizer sensor integrated on the electronic display.

According to an aspect of some exemplary embodiments there is provided a method comprising: providing an electronic display included an array of optical sensing elements embedded on at least one layer of a stackup forming the electronic display; detecting outputs from the optical sensing elements while a user interacts by touch with the electronic display; and reporting a location of the pressure or a level of the pressure based on the outputs detected, wherein the outputs from the optical sensing elements is related to pressure applied on the electronic display based on a defined relationship.

Optionally, the optical sensing elements are configured to detect light shuttering through a BLU optical stackup included in the electronic display, wherein the light shuttering is based on bending of the BLU optical stackup at a location of touch interaction with the electronic display.

Optionally, the optical sensing elements are configured to detect light scattering through a transparent layer of a BLU optical stackup included in the electronic display, wherein the light scattering is based on bending and physical contact of the BLU optical stackup at a location of touch interaction with the electronic display.

Optionally, the optical sensing elements are configured to detect changes in light intensity based on bending and physical contact of the stackup, wherein the bending is based on pressure applied on the electronic display during user touch interaction.

Optionally, outputs from the optical sensing elements is related to output from a capacitive based digitizer sensor associated with the electronic display.

Optionally, the method includes detecting location of a non-conductive object interaction with the electronic display based on outputs from the optical sensing elements.

According to some exemplary embodiments, there is provided a device comprising: an electronic display formed with a stackup of layers; at least one acoustic transducer/receiver embedded on at least one layer of the stackup or on a chassis of the display; and a circuit connected to the at least one acoustic transducer/receiver, wherein the circuit is configured to relate output from the acoustic receiver to pressure applied on the electronic display.

Optionally, the acoustic receiver detects bending and physical contact of one or more layers of the stackup.

An aspect of some exemplary embodiments provides for a device comprising: an electronic display supported in a display chassis; a digitizer sensor overlaid on the electronic display; wherein the electronic display includes an electrostatic discharge (ESD) shield layer, wherein the ESD shield layer is electrically connected to device ground and wherein impedance to the device ground of the ESD shield layer is configured to be sensitive to pressure applied on the digitizer sensor during user interaction; and a circuit configured to detected touch interaction with the digitizer sensor based on output sampled, wherein the output is sensitive to the change in the impedance of ESD shield layer to the device ground; and a display controller configured to control output on the electronic display.

Optionally, the device comprises conductive material configured to provide an electrical connection between the ESD shield layer and the device ground, wherein the conductive material is configured to alter its conductive properties in response to strain on the conductive material based on the pressure applied on the digitizer sensor.

Optionally, the conductive material is rim conductive tape, wherein the rim conductive tape is configured to secure the electronic display to the display chassis, wherein the display chassis is connected to the device ground.

Optionally, the rim conductive tape includes a plurality of strips that are electrically disconnected from one another.

Optionally, the conductive material includes conductive dots configured to electrically connect the ESD shield layer to the device ground.

Optionally, the electronic display includes a thin-film transistor (TFT) layer connected to the display controller, wherein the display controller is electrically connected to the device ground and wherein the electrical connection of the ESD shield layer to the device ground is via the TFT layer and the display controller.

Optionally, the conductive dots includes a plurality of conductive dots arranged along edges of at least one layer of a stackup forming the display.

Optionally, the circuit is configured to detect a change in a baseline output detected on the digitizer sensor, wherein the change in the baseline output is based on changes in the impedance to ground of the ESD shield layer and wherein the baseline output is the output detected from the digitizer sensor at a location with no user interaction.

Optionally, a level of pressure applied on the digitizer sensor is based on the detected change in the baseline output.

Optionally, the circuit is associated with memory and wherein a defined relationship relating baseline output with pressure applied on the digitizer sensor is stored in the memory.

Optionally, the circuit is configured switch from a sleep mode to an active mode based on detecting pressure applied on the digitizer sensor during user interaction with the digitizer sensor.

According to an aspect of some exemplary embodiments there is provided a method comprising: electrically connecting an ESD shield layer of an electronic display to device ground, wherein a digitizer sensor is overlaid on the electronic display and wherein an impedance to the device ground of the ESD shield layer is configured to be sensitive to pressure applied on the digitizer sensor during user interaction; detecting touch interaction with the digitizer sensor based on output from a circuit associated with the digitizer sensor, wherein the output is sensitive to the change in the impedance to the device ground of the ESD shield layer.

Optionally, changes to the impedance of the ESD shield layer to the device ground ESD shield layers based on conductive material configured to provide an electrical connection between the ESD shield layer and the device ground, wherein the conductive material is configured to alter its conductive properties in response to strain on the conductive material based on the pressure applied on the digitizer sensor.

Optionally, the conductive material is rim conductive tape, wherein the rim conductive tape is configured to secure the electronic display to a display chassis.

Optionally, the rim conductive tape includes a plurality of strips that are electrically disconnected from one another.

Optionally, the conductive material includes conductive dots configured to electrically connect the ESD shield layer to device ground via a display chassis.

Optionally, the conductive dots includes a plurality of conductive dots arranged along edges of at least one layer of a stackup forming the display.

Optionally, the method includes detecting a change in a baseline output detected on the digitizer sensor based on the changes to the impedance to the device ground of the ESD shield layer, wherein the baseline output is the output detected from the digitizer sensor at a location with no user interaction; and relating a level of pressure applied on the digitizer sensor based on the detected change in the baseline output; and reporting the level of pressure.

Optionally, the method includes switching from a sleep mode to an active mode based on detecting touch interaction with the digitizer sensor.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:
1. A device comprising:
an electronic display supported in a display chassis;
a digitizer sensor overlaid on the electronic display;

wherein the electronic display includes an electrostatic discharge (ESD) shield layer, wherein the ESD shield layer is electrically connected to device ground and wherein impedance to the device ground of the ESD shield layer is configured to be sensitive to pressure applied on the digitizer sensor during user interaction;

a circuit configured to detected touch interaction with the digitizer sensor based on output sampled, wherein the output is sensitive to the change in the impedance of ESD shield layer to the device ground; and a display controller configured to control output on the electronic display.

2. The device of claim 1, comprising conductive material configured to provide an electrical connection between the ESD shield layer and the device ground, wherein the conductive material is configured to alter its conductive properties in response to strain on the conductive material based on the pressure applied on the digitizer sensor.

3. The device according to claim 2, wherein the conductive material is rim conductive tape, wherein the rim conductive tape is configured to secure the electronic display to the display chassis, wherein the display chassis is connected to the device ground.

4. The device according to claim 3, wherein the rim conductive tape includes a plurality of strips that are electrically disconnected from one another.

5. The device according to claim 2, wherein the conductive material includes conductive dots configured to electrically connect the ESD shield layer to the device ground.

6. The device according to claim 5, wherein the electronic display includes a thin-film transistor (TFT) layer connected to the display controller, wherein the display controller is electrically connected to the device ground and wherein the electrical connection of the ESD shield layer to the device ground is via the TFT layer and the display controller.

7. The device according to claim 5, wherein the conductive dots includes a plurality of conductive dots arranged along edges of at least one layer of a stackup forming the display.

8. The device according to claim 1, wherein the circuit is configured to detect a change in a baseline output detected on the digitizer sensor, wherein the change in the baseline output is based on changes in the impedance to ground of the ESD shield layer and wherein the baseline output is the output detected from the digitizer sensor at a location with no user interaction.

9. The device according to claim 8, wherein a level of pressure applied on the digitizer sensor is based on the detected change in the baseline output.

10. The device according to claim 8, wherein the circuit is associated with memory and wherein a defined relationship relating baseline output with pressure applied on the digitizer sensor is stored in the memory.

11. The device according to claim 1, wherein the circuit is configured switch from a sleep mode to an active mode based on detecting pressure applied on the digitizer sensor during user interaction with the digitizer sensor.

12. A method comprising:
electrically connecting an ESD shield layer of an electronic display to device ground, wherein a digitizer sensor is overlaid on the electronic display and wherein an impedance to the device ground of the ESD shield layer is configured to be sensitive to pressure applied on the digitizer sensor during user interaction;

detecting touch interaction with the digitizer sensor based on output from a circuit associated with the digitizer sensor, wherein the output is sensitive to the change in the impedance to the device ground of the ESD shield layer.

13. The method according to claim 12, wherein changes to the impedance of the ESD shield layer to the device ground ESD shield layers based on conductive material configured to provide an electrical connection between the ESD shield layer and the device ground, wherein the conductive material is configured to alter its conductive properties in response to strain on the conductive material based on the pressure applied on the digitizer sensor.

14. The method according to claim 13, wherein the conductive material is rim conductive tape, wherein the rim conductive tape is configured to secure the electronic display to a display chassis.

15. The method according to claim 14, wherein the rim conductive tape includes a plurality of strips that are electrically disconnected from one another.

16. The method according to claim 13, wherein the conductive material includes conductive dots configured to electrically connect the ESD shield layer to device ground via a display chassis.

17. The method according to claim 16, wherein the conductive dots includes a plurality of conductive dots arranged along edges of at least one layer of a stackup forming the display.

18. The method according to claim 12, comprising:
detecting a change in a baseline output detected on the digitizer sensor based on the changes to the impedance to the device ground of the ESD shield layer, wherein the baseline output is the output detected from the digitizer sensor at a location with no user interaction;
relating a level of pressure applied on the digitizer sensor based on the detected change in the baseline output; and
reporting the level of pressure.

19. The method according to claim 12, comprising switching from a sleep mode to an active mode based on detecting touch interaction with the digitizer sensor.

* * * * *